US010061618B2

(12) United States Patent
Peterson et al.

(10) Patent No.: US 10,061,618 B2
(45) Date of Patent: Aug. 28, 2018

(54) SCHEDULING HETEROGENOUS COMPUTATION ON MULTITHREADED PROCESSORS

(75) Inventors: Luke Tilman Peterson, Oakland, CA (US); James Alexander McCombe, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 1512 days.

(21) Appl. No.: 13/368,682

(22) Filed: Feb. 8, 2012

(65) Prior Publication Data
US 2012/0324458 A1 Dec. 20, 2012

Related U.S. Application Data

(60) Provisional application No. 61/497,915, filed on Jun. 16, 2011, provisional application No. 61/515,824, filed on Aug. 5, 2011.

(51) Int. Cl.
G06F 9/50 (2006.01)
G06F 9/38 (2018.01)
G06F 9/46 (2006.01)

(52) U.S. Cl.
CPC .......... *G06F 9/5038* (2013.01); *G06F 9/3828* (2013.01); *G06F 9/3851* (2013.01); *G06F 9/3891* (2013.01); *G06F 2209/506* (2013.01)

(58) Field of Classification Search
None
See application file for complete search history.

(56) References Cited

U.S. PATENT DOCUMENTS 750,948 A 2/1904 Hayes
4,466,061 A 8/1984 Desantis et al.
(Continued)

FOREIGN PATENT DOCUMENTS

WO WO9617326 6/1996
WO 2007070456 A 6/2007
(Continued)

OTHER PUBLICATIONS

A. Augusto de Sousa and F. Nunes Ferreira, "A Scalable Implementation of an Interactive Increasing Realism Ray-Tracing Algorithm," Vector and Parallel Processing—VECPAR '96. Second International Conference on Vector and Parallel Processing—Systems and Applications. Selected Papers Springer-Verlag Berlin, Germany, 1997, pp. 458-469.
(Continued)

*Primary Examiner* — Wynuel Aquino
(74) *Attorney, Agent, or Firm* — Vorys, Sater, Seymour and Pease LLP; Vincent M DeLuca

(57) ABSTRACT

Aspects include computation systems that can identify computation instances that are not capable of being reentrant, or are not reentrant capable on a target architecture, or are non-reentrant as a result of having a memory conflict in a particular execution situation. A system can have a plurality of computation units, each with an independently schedulable SIMD vector. Computation instances can be defined by a program module, and a data element(s) that may be stored in a local cache for a particular computation unit. Each local cache does not maintain coherency controls for such data elements. During scheduling, a scheduler can maintain a list of running (or runnable) instances, and attempt to schedule new computation instances by determining whether any new computation instance conflicts with a running instance and responsively defer scheduling.
(Continued)

Memory conflict checks can be conditioned on a flag or other indication of the potential for non-reentrancy.

22 Claims, 11 Drawing Sheets

(56) References Cited

U.S. PATENT DOCUMENTS

| | | | |
|---|---|---|---|
| 4,625,289 A | 11/1986 | Rockwood | |
| 5,239,654 A | 8/1993 | Ing-Simmons et al. | |
| 5,313,568 A | 5/1994 | Wallace | |
| 5,933,146 A | 8/1999 | Wrigley | |
| 5,973,699 A | 10/1999 | Kent | |
| 6,023,279 A | 2/2000 | Sowizral et al. | |
| 6,028,608 A | 2/2000 | Jenkins | |
| 6,111,582 A | 8/2000 | Jenkins | |
| 6,344,837 B1 | 2/2002 | Gelsey | |
| 6,489,955 B1 | 12/2002 | Newhall, Jr. | |
| 6,556,200 B1 | 4/2003 | Pfister et al. | |
| 6,559,843 B1 | 5/2003 | Hsu | |
| 6,598,140 B1* | 7/2003 | McAllister et al. | 711/168 |
| 6,731,304 B2 | 5/2004 | Sowizral et al. | |
| 6,735,763 B1* | 5/2004 | Enokida | 717/143 |
| 7,009,608 B2 | 3/2006 | Pharr et al. | |
| 7,012,604 B1 | 3/2006 | Christie et al. | |
| 7,030,879 B1 | 4/2006 | Pharr | |
| 7,071,938 B2 | 7/2006 | Herken | |
| 7,098,907 B2 | 8/2006 | Houston et al. | |
| 7,212,207 B2 | 5/2007 | Green | |
| 7,250,948 B2 | 7/2007 | Hayes | |
| 7,289,118 B2 | 10/2007 | Schmittler et al. | |
| 7,348,975 B2 | 3/2008 | Reshetov et al. | |
| 7,362,332 B2 | 4/2008 | Gritz | |
| 7,479,962 B2 | 1/2009 | Herken | |
| 7,483,024 B2 | 1/2009 | Maillot | |
| 7,606,985 B2* | 10/2009 | Alsup | 711/152 |
| 7,688,320 B2 | 3/2010 | Shearer | |
| 7,782,318 B2 | 8/2010 | Shearer | |
| 7,830,379 B2 | 11/2010 | Peterson et al. | |
| 7,925,860 B1 | 4/2011 | Juffa et al. | |
| 8,028,152 B2* | 9/2011 | Glew | 712/220 |
| 8,332,862 B2* | 12/2012 | Isard et al. | 718/104 |
| 2004/0154011 A1* | 8/2004 | Wang et al. | 717/158 |
| 2004/0249809 A1 | 12/2004 | Ramani et al. | |
| 2005/0264568 A1 | 12/2005 | Keller | |
| 2006/0053189 A1 | 3/2006 | Mantor | |
| 2006/0098009 A1 | 5/2006 | Zuniga | |
| 2006/0139350 A1 | 6/2006 | Reshetov | |
| 2007/0035545 A1 | 2/2007 | Hempel et al. | |
| 2007/0132754 A1 | 6/2007 | Reshetov et al. | |
| 2008/0024489 A1 | 1/2008 | Shearer | |
| 2008/0028154 A1 | 1/2008 | Hoover | |
| 2008/0028403 A1 | 1/2008 | Hoover | |
| 2008/0049017 A1 | 2/2008 | Shearer | |
| 2008/0074420 A1 | 3/2008 | Kuesel | |
| 2008/0074421 A1 | 3/2008 | Hayes | |
| 2008/0074433 A1* | 3/2008 | Jiao | G06T 15/005 345/522 |
| 2008/0088622 A1 | 4/2008 | Shearer | |
| 2008/0122841 A1 | 5/2008 | Brown | |
| 2008/0122845 A1 | 5/2008 | Brown et al. | |
| 2008/0129734 A1 | 6/2008 | Seung-Woo et al. | |
| 2008/0143730 A1* | 6/2008 | Lindholm | G06F 9/5044 345/501 |
| 2008/0180442 A1 | 7/2008 | Brown et al. | |
| 2008/0211804 A1 | 9/2008 | Hempel et al. | |
| 2009/0102844 A1 | 4/2009 | Deparis | |
| 2009/0113170 A1* | 4/2009 | Abdallah | 712/17 |
| 2009/0113443 A1* | 4/2009 | Heller, Jr. et al. | 718/106 |
| 2009/0183167 A1 | 7/2009 | Kupferschmidt et al. | |
| 2009/0189898 A1 | 7/2009 | Dammertz et al. | |
| 2009/0235254 A1* | 9/2009 | Michael | 718/101 |
| 2010/0194751 A1 | 8/2010 | Wald et al. | |
| 2012/0173818 A1* | 7/2012 | Martin | G06F 12/0895 711/118 |

FOREIGN PATENT DOCUMENTS

| | | |
|---|---|---|
| WO | 2007090974 A | 8/2007 |
| WO | WO2008037599 | 4/2008 |

OTHER PUBLICATIONS

A.J. van der Pioeg, "Interactive Ray Tracing, the replacement of rasterization?" B.Sc. thesis, VU University Amsterdam, The Netherlands, Dec. 2006. (Available at http://www.cs.vu.nl/.about.kielmann/theses/avdpioeg.pdf, last visted on Mar. 31, 2008.).

C. Benthin, I. Wald M. Scherbaum and H. Friedrich, "Ray Tracing on the Cell Processor," IEEE Symposium on Interactive Ray Tracing 2006, Sep. 18-20, 2006. pp. 15-23, Salt Lake City, UT.

Carsten Benthin, PhD thesis: "Realtime Ray Tracing on Current CPU Architectures," Saarland University Saarbrucken, Germany, Jan. 2006. (Available at graphics.cs.uni-sb.de/.about.benthin/phd.pdf, last visited on Jan. 7, 2008.).

E Groller and W. Purgathofer, "Coherence in Computer Graphics," Institute for Computer Graphics, Technical University Vienna, Vienna, Austria, Trans. on Information and Communication Technologies, vol. 5, 1993 WIT Press.

E. Mansson, J. Munkberg and T. Akenine-Moller, "Deep Coherent Ray Tracing," RT 07—Symposium on Interactive Ray Tracing 2007, Sep. 10-12, 2007, pp. 79-85. (Available at http://graphics.cs.lth.se/research/papers/2007/deepcoh/deepcoherent.pdf, last visited Jan. 7, 2008.).

F James, "Monte Carlo theory and practice," Report on Progress in Physics, vol. 43, 1980, pp. 1145-1189, The Institute of Physics, Great Britain.

Frederic Cazals, George Drettakis and Claude Puech, "Filtering, Clustering and Hierarchy Construction: a New Solution for Ray-Tracing Complex Scenes," Computer Graphics Forum (Eurographics '95) 14, 3.

G. Humphreys and C.S. Ananian, "TigerSHARK: A Hardware Accelerated Ray-Tracing Engine," Technical report, Princeton University, Princeton, NJ, May 14, 1996. (Available at citeseer.ist.psu.edu/article/humphreys96tigershark.html, last visited on Jan. 7, 2008.).

Geoff Wyvill, "Practical Ray Tracing," Computer Graphics International 1995, Tutorial notes.

H. Du, M. Sanchez-Elez, N. Tabrizi, N. Bagherzadeh, M.L. Anido and M. Fernandez, "Interactive Ray Tracing on Reconfigurable SIMD MorphoSys," Proceedings of the Design, Automation and Test in Europe Conference and Exhibition, 2003, Asia and South Pacific Jan. 21-24, 2003, pp. 471-476.

H. Friedrich, J. Gunther, A. Dietrich, M. Scherbaum, H-P Seidel and P. Slusallek, "Exploring the Use of Ray Tracing for Future Games," Proceedings of the 2006 ACM SIGGRAPH symposium on Videogames , Boston, MA, pp. 41-50, 2006.

Hank Weghorst, Gary Hooper and Donald P. Greenberg, "Improved Computational Methods for Ray Tracing," ACM Transactions on Graphics (TOG), Jan. 1984, vol. 3, issue 1, pp. 52-69.

I. Wald and P. Slusailek, "State of the Art in Interactive Ray Tracing," In State of the Art Reports, EUROGRAPHICS 2001, pp. 21-42, 2001.

I. Wald, C. Gribble, S. Boulos and A. Kensler, "SIMD Ray Stream Tracing—SIMD Ray Traversal with Generalized Ray Packets and On-the-fly Re-Ordering," SCI Institute Technical Report No. UUSCI-2007-012, 2007.

I. Wald, P. Slusaliek and C. Benthin, "Interactive Distributed Ray Tracing of Highly Complex Models," Rendering Techniques 2001—Proceedings of the 12th EUROPGRAPHICS Workshop on Render, pp. 274-285, London, England, Jun. 2001.

I. Wald, P. Slusallek, C. Benthin and M. Wagner, "Interactive Rendering with Coherent Ray Tracing," Computer Graphics Forum, Proceedings of Eurographics 2001, vol. 20, No. 3, 2001.

J. Fender and J. Rose, "A High-Speed Ray Tracing Engine Built on a Field-Programmable System," Proceedings of the 2003 IEEE International Conference on Field-Programmable Technology (FPT), Dec. 15-17, 2003, pp. 188-195.

(56) References Cited

OTHER PUBLICATIONS

J. Hanika and A. Keller, "Towards Hardware Ray Tracing using Fixed Point Arithmetic," IEEE/EG Symposium on Interactive Ray Tracing, 2007, Sep. 10-12, 2007, Ulm, Germany, pp. 119-128.

J.G. Cleary, B.M. Wyvill, G.M. Birtwistie and R. Vatli, "Multiprocessor Ray Tracing," Computer Graphics Forum, vol. 5, issue 1, pp. 3-12, 1986.

James Arvo and David Kirk, "Fast Ray Tracing by Ray Classification," ACM SIGGRAPH Computer Graphics 21 (4), Jul. 1987, pp. 55-64.

James Bigler, Abe Stephens and Steven G. Parker, "Design for Parallel Interactive Ray Tracing Systems," Proceedings of the IEEE Symposium on Interactive Ray Tracing, 2006, pp. 187-196.

James T. Klosowski, Martin Held, Joseph S.B. Mitchell, Henry Sowizral and Karel Zikan, "Efficient Collision Detection Using Bounding Volume Hierarchies of k-DOPs," IEEE Transactions on Visualization and Computer Graphics, Jan. 1998, vol. 4, issue 1, pp. 21-36.

Jeffrey A. Mahovsky, "Ray-Tracing with Reduced-Precision Bounding Volume Hierarchies," PhD thesis, University of Calgary, Alberta, Canada, 2005. (Available at http://pages.cpsc.ucalgary.ca/.about.brosz/theses/PhD%20Thesie%20-%202005- %20-%20Jeffrey%20Mahovsky%20-%20Ray%20Tracing%20with %20Reduced-Precision%2-0Bounding%20Volume %20Hierarchies.pdf, last visited on Mar. 31, 2008).

John Amanatides, "Ray Tracing with Cones," ACM SIGGRAPH Computer Graphics 18(3), Jul. 1984, pp. 129-135.

Jorg Schmittler, Ingo Wald, and Philipp Slusallek, "SaarCOR—A Hardware Architecture for Ray Tracing," Proceedings of the ACM SIGGRAPH/EUROGRAPHICS conference on Graphics hardware, Saarbrucken, Germany, Session: Ray tracing vs. scan conversion, pp. 27-36, 2002.

K. R. Subramanian and Donald S. Fussell, "A Search Structure based on K-d Trees for Efficient Ray Tracing," PhD thesis, The University of Texas at Austin, Dec. 1990.

Kenneth I. Joy and Murthy N. Bhetanabhotla, "Ray Tracing Parametric Surface Patches Utilizing Numerical Techniques and Ray Coherence," ACM SIGGRAPH Computer Graphics 20(4), Aug. 1986, pp. 279-285.

M. Pharr, C. Kolb, R. Gershbein and P. hanrahan, "Rendering Complex Scenes with Memory-Coherent Ray Tracing," in Computer Graphics, vol. 31, pp. 101-108, Aug. 1997, ACM SIGGRAPH 1997 Conference Proceedings.

M. Sanchez-Eiez, H. Du, N. Tabrizi, Y. Long, N. Bagherzadeh and M. Fernandez, "Algorithm Optimizations and Mapping Scheme for Interactive Ray Tracing on a Reconfigurable Architecture," Computers & Graphics 27(5), 2003, pp. 701-713.

M. Shinya, T. Takahashi and S. Naito, "Principles and Application of Pencil Tracing," ACM SIGGRAPH Computer Graphics 21(4), Jul. 1987, pp. 45-54.

M.L. Anido, N. Tabrizi, H. Du, M. Sanchez-Elez M and N. Bagherzadeh, "Interactive Ray Tracing Using a SIMD Reconfigurable Architecture," Proceedings of the 14th Symposium on Computer Architecture and High Performance Computing, 2002, pp. 20-28.

Martin Christen, "Ray Tracing on GPU," Master's thesis, Univ. of Applied Sciences Basel (FHBB), Jan. 19, 2005 (Available online at http://gpurt.sourceforge.net/DA07.sub.--0405.sub.-- Ray.sub.--Tracing.sub.--on.sub.--GPU-1.0.5.pdf, last visited Dec. 10, 2009).

Masataka Ohta and Mamoru Maekawa, "Ray-bound tracing for perfect and efficient anti-aliasing," The Visual Computer: International Journal of Computer Graphics, vol. 6, issue 3, Springer Berlin / Heidelberg, May 1990, pp. 125-133.

N. Thrane and L.O. Simonsen, "A Comparison of Acceleration Structures for GPU Assisted Ray Tracing", Masters thesis, University of Aarhus, Denmark, Aug. 1, 2005. (Available at http://www.larsole.com/files/GPU.sub.--BVHthesis.pdf, last visited on Jan. 7, 2008.).

P A. Navratil, D. S. Fussell, C. Lin and W. R. Mark, "Dynamic Ray Scheduling to Improve Ray Coherence and Bandwidth Utilization," IEEE Symposium on Interactive Ray Tracing, 2007, Sep. 10-12, 2007, pp. 95-104.

P. H. Christensen, J. Fong, D. M. Laur and Dana Batali, "Ray Tracing for the Movie 'Cars'," IEEE Symposium on Interactive Ray Tracing, 2006, pp. 1-6.

P.A. Navratil, D.S. Fussell and C. Lin, "Dynamic Ray Scheduling for Improved System Performance," The University of Texas at Austin, Department of Computer Sciences, Technology Report #TR-07-19, Apr. 12, 2007. (Available at http://www.cs.utexas.edu/.about.pnav/papers/utcs-tr-07-19/utcs-tr-07-19.p- df, last visited Jan. 7, 2008.).

Paul S. Heckbert and Pat Hanrahan, "Beam Tracing Polygonal Objects," ACM SIGGRAPH Computer Graphics 18(3), Jul. 1984, pp. 119-127.

Peter Shirley, Changyaw Wang and Kurt Zimmerman "Monte Carlo Techniques for Direct Lighting Calculations," ACM Transactions on Graphics, vol. 15, Issue 1, Jan. 1996, pp. 1-36, ACM, New York, New York.

Roni Yagel and John Meeker, "Priority-driven Ray Tracing," The Journal of Visualization and Computer Animation, vol. 8, No. 1, pp. 17-32, Jan. 1, 1997.

Russel E. Caflisch and Bradley Moskowitz, "Modified Monte Carlo Methods Using Quasi-Random Sequences," Lecture Notes in Statistics 106, Dec. 1994, Mathematics Department, UCLA, Los Angeles, CA.

Spjut "TRaX: A Multi-Threaded Architecture for Real-Time Ray Tracing" Application Specific Processors, 2008. SASP 2008. pp. 108-114.

Stefan Heinrich and Alexander Keller, "Quasi-Monte Carlo Methods in Computer Graphics, Part I: The QMC Buffer," Technical Report 242/94, Fachbereich Informatik, AG Numerische Algorithmen, Universit at Kaiserslautern, 1994.

Stefan Heinrich and Alexander Keller, "Quasi-Monte Carlo Methods in Computer Graphics, Part II: The Radiance Equation," Technical Report 243/94, Fachbereich Informatik, AG Numerische Algorithmen, Universit"at Kaiserslautern, 1994.

Sugerman, "GRAMPS: A Programming Model for Graphics Pipelines", ACM Transactions on Graphics, vol. 28, No. 1, Article 4, Publication date: Jan. 2009.

Sven Woop, Jorg Schmittler and Philipp Slusallek, "RPU: A Programmable Ray Processing Unit for Realtime Ray Tracing," ACM Transactions on Graphics (TOG), vol. 24, Issue 3, (Jul. 2005), Proceedings of ACM SIGGRAPH 2005, session: Hardware rendering, pp. 434-444, 2005.

W.R. Mark and D. Fussell, "Real-Time Rendering Systems in 2010," The University of Texas at Austin, Department of Computer Sciences, Technical Report # TR-05-18, May 2, 2005. (Available at http://www-csl.csres.utexas.edu/users/billmark/papers/rendering2010-TR/TR- 05-18-Rendering2010.pdf, last visited Jan. 7, 2008.).

Wachter "Quasi-Monte Carlo Light Transport Simulation by Efficient Ray Tracing" Phd Disseration (2008) Ulm University http://vts.uni-ulm.de/query/longview.meta.asp?document_id=6265.

Wilfrid Lefer "An Efficient Parallel Ray Tracing Scheme for Distributed Memory Parallel Computers," Oct. 25, 1993, Parallel Rendering Symposium, 1993 San Jose, CA, USA Oct. 25-26, 1993, New York, NY, USA, IEEE, pp. 77-80.

\* cited by examiner

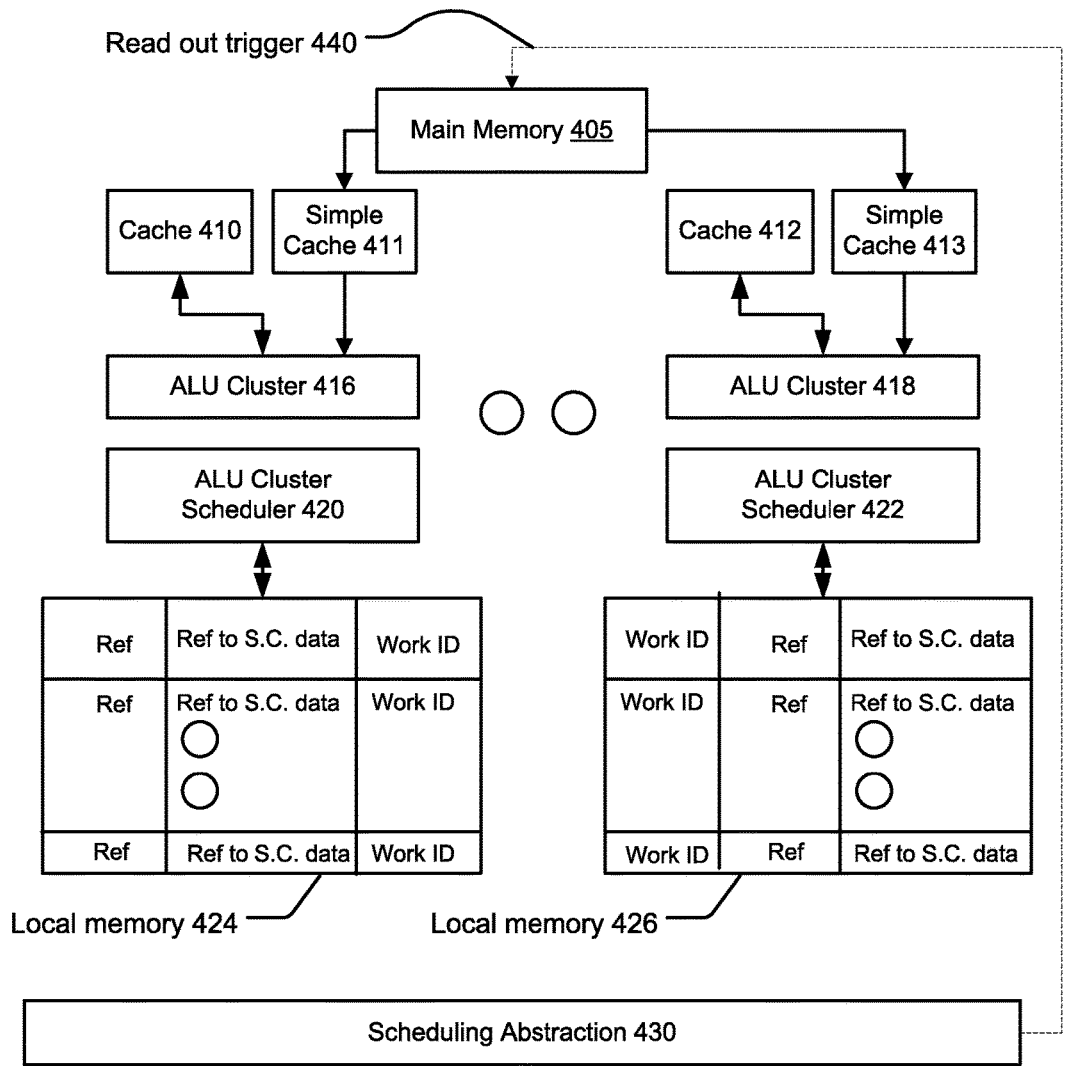
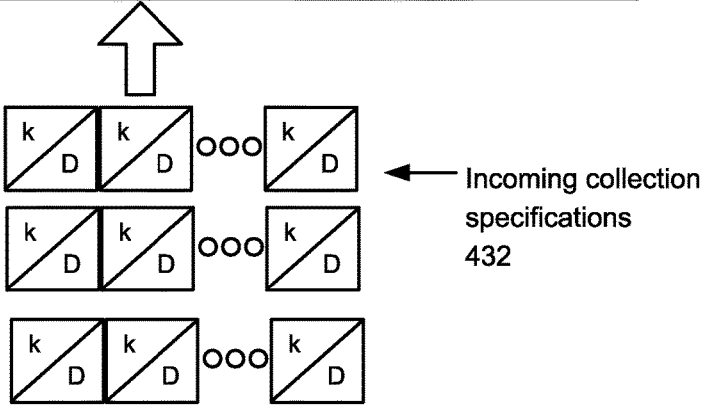
FIG. 4

SCHEDULING HETEROGENOUS COMPUTATION ON MULTITHREADED PROCESSORS

CROSS REFERENCE TO RELATED APPLICATIONS

This application claims priority from U.S. provisional application No. 61/497,915, entitled "Non-Blocking Concurrent Computation Architectures", filed Jun. 16, 2011, and from U.S. provisional application No. 61/515,824, entitled "Heterogeneous Concurrent Computation", filed Aug. 5, 2011, all of which is incorporated by reference in their entirety for all purposes herein.

BACKGROUND

Field

The following relates to approaches to scheduling computation in multithreaded processors or groupings thereof, and in a more particular aspect, to scheduling for graphics processors with clusters of SIMD computation units.

Related Art

Parallel computation paradigms present theoretical possibilities to continue acceleration of processing computation workloads. However, taking full advantage of parallel processing is challenging. Approaches to increased parallelism that present a comparatively low burden on programmers (such as SIMD processors) can increase parallelism to some extent, and work better on some workloads than others. Other approaches to parallelism, such as multithreading require more intensive coding practices, and present other overhead, such as context switching logic.

Examples of workloads than benefit from further development of approaches to parallel processing comprise graphics processing, and in a more particular example, ray tracing of 3-D scenes to render high quality 2-D images, such as photo-realistic 2-D images. Ray tracing is known to produce photo-realistic images, including realistic shadow and lighting effects, because ray tracing can model the physical behavior of light interacting with elements of a scene. Ray tracing usually involves obtaining a scene description composed of geometric shapes, which describe surfaces of structures in the scene, and can be called primitives. A common primitive shape is a triangle. Objects can be composed of one or more such primitives. Objects each can be composed of many thousands, or even millions (or more) of such primitives. Scenes typically contain many objects, leading to scenes of tens or hundreds of millions of primitives. Resolution of displays and the media to be displayed thereon continue to increase. Ray tracing requires repeating a few calculations many times with different data (e.g. intersection testing), as well as executing special purpose code ("shading") for identified ray intersections.

SUMMARY

In one aspect, a system for performing graphics computation has a plurality of clusters of computation units. Each computation unit has a plurality of ALUs and a working memory used by the ALUs during execution of tasks on the ALUs. The system also has a distributor of computation tasks among the ALUs. The distributor is coupled to read tasks from a queue of tasks, and is operable to assign the tasks for execution on the plurality of clusters. The assigning comprises, for each of the clusters, determining which locations of each working memory are referenced by non-reentrant tasks currently scheduled for execution in that cluster, and dispatching non-reentrant tasks for execution by a identified cluster with a working memory that has a location referenced by the task, and which is currently not being referenced by any non-reentrant task executing on that cluster. The distributor can be implemented by logic elements associated with respective clusters, each of which determine non-reentrancy for instances that are to be executed on its cluster. Such determination can account for current execution status of other instances on that cluster. The distributor can include a plurality of input buffers for the clusters. The input buffers are operable to store descriptions of non-reentrant tasks to be scheduled on a respective cluster awaiting completion of execution of a conflicting non-reentrant task on that cluster.

In an aspect, a system comprises a plurality of clusters, each cluster comprising a plurality of ALUs and a memory used by the ALUs as working memory during execution of tasks on the ALUs. In one example, each ALU of each cluster comprises a Single Instruction Multiple Data (SIMD) execution unit having a vector width, and the local scheduler for each cluster is operable to switch among different streams of instructions to be scheduled for execution on the cluster, on a cycle by cycle basis.

In some aspects, the system is operable to flag tasks as re-entrant or non-reentrant, and a local scheduler for each cluster is operable to condition the detecting of conflicting tasks on a flag associated with a received task, so that only non-reentrant tasks are checked for conflict by the local scheduler.

In some aspects, methods of task scheduling include receiving specifications for computation tasks to be performed in a cluster of computation units, maintaining a list of tasks that have been scheduled to execute in the cluster. The list comprises information indicating whether any of the tasks on the list are non-reentrant. The methods also include scheduling tasks to be executed from among the tasks specified by the received specifications. The scheduling includes deferring scheduling of any task, among the tasks specified by the received specifications, that is non-reentrant and has a capability to write to a memory location shared by any non-reentrant task on the list of tasks.

Articles of manufacture can be made to implement these aspects. Such articles comprise integrated circuitry capable of being programmed to render computer graphics images. Such integrated circuitry includes clusters, each comprising a plurality of ALUs and a cache. Circuitry for implementing a scheduler for scheduling computation tasks on the cluster, from a list of available tasks is also provided. The tasks are reentrant tasks and non-reentrant tasks. The non-reentrant tasks include an indication of at least one location in the cache that can be written by that task during execution. The scheduler is operable, for each non-reentrant task to be scheduled, to compare the respective indicated location in the cache with the indicated locations of each non-reentrant task in the list of tasks, and to add only non-reentrant tasks that have indicated cache locations that do not conflict with indicated locations of non-reentrant tasks in the list of tasks.

Other aspects include a graphics computation system. The system comprises a plurality of clusters, each comprising a plurality of ALUs and a memory used by the ALUs as working memory during execution of tasks on the ALUs. A global scheduler is operable to enqueue packets indicating processing to be conducted on the clusters, each packet identifying a program module and a groups of data elements to be distributed among the clusters for use during execution of the program module. Respective schedulers are each operable to receive packets from the global scheduler, to maintain a set of threads for which resources of the cluster have been allocated, and to determine when program modules from received packets will be added to the set of threads. Such determining includes determining that one or more of the data elements provided from the global scheduler are not being accessed by any thread of the set of threads. Each scheduler operates to run the ALUs with instructions from a selected thread, using plural data elements received from multiple packets over a time period.

In some aspects, schedulers maintain respective lists of in-progress program instances and in response to completion of a program instance, attempt to schedule a replacement selected from among the received instances, the selecting comprising determining whether any received program instance that is non-reentrant has a conflicting memory access with any of the remaining in-progress program instances.

BRIEF DESCRIPTION OF THE DRAWINGS

FIG. 4 depicts an example of scheduling collections of computation instances on a computation cluster according to the disclosure;

DETAILED DESCRIPTION

Parallelism is a design goal and concept that can be implemented at different levels of abstraction within a computation system, and consequently can refer to a panoply of disparate concepts. A high level perspective can focus on parallelism of entire software packages so that they can run concurrently on a given computer. Some amount of parallelism can be extracted at such level.

A finer-grained parallelism concerns how to better schedule smaller portions of computation to reduce wasted opportunities to perform useful computation. However, a primary concern is to produce a correct result. In some cases, a programmer has little idea what kind of computation architecture may be used to execute a particular portion of code (or may desire the code to be easily portable across a variety of architectures). Therefore, the programmer may follow a set of programming practices designed to provide a self-consistent output. For example, if a particular code module may be executed in a multithreaded system, then some variables manipulated by that code module may need to be protected by synchronization mechanisms, such as spinlocks, or mutexes. These kinds of safety mechanisms add overhead to a system both by requiring resources to implement them, but also can prevent execution of other code modules that would otherwise be available to be executed.

Computation architectures according to one aspect of this disclosure provide an approach wherein a relatively traditional multithreading programming model is available for tasks that effectively use that model, and a different programming model is available for other kinds of computation problems. Such other kinds of tasks involve situations where a large number of data elements need to be processed with a relatively small number of routines, that may have branching, conditions, or other computations, but which may have simpler control structure than a typical application expected to run on a general purpose processor. For these kinds of computation problems, an element of data ("a primary element") may be used relatively persistently in processing more transient data elements. Thus, in one approach, tasks can be defined on a level that correlates to the duration of persistence of the primary element, and further defined on a level correlating to the duration of usage of secondary elements. As an example, in the context of ray tracing, a task of intersection testing a ray can be defined on a level correlating to completion of testing that ray, so that definition data for the ray corresponds to a primary element. When a particular shape is to be tested with that ray, a task can be further defined with a secondary element of that shape, and the ray.

Figure 1:
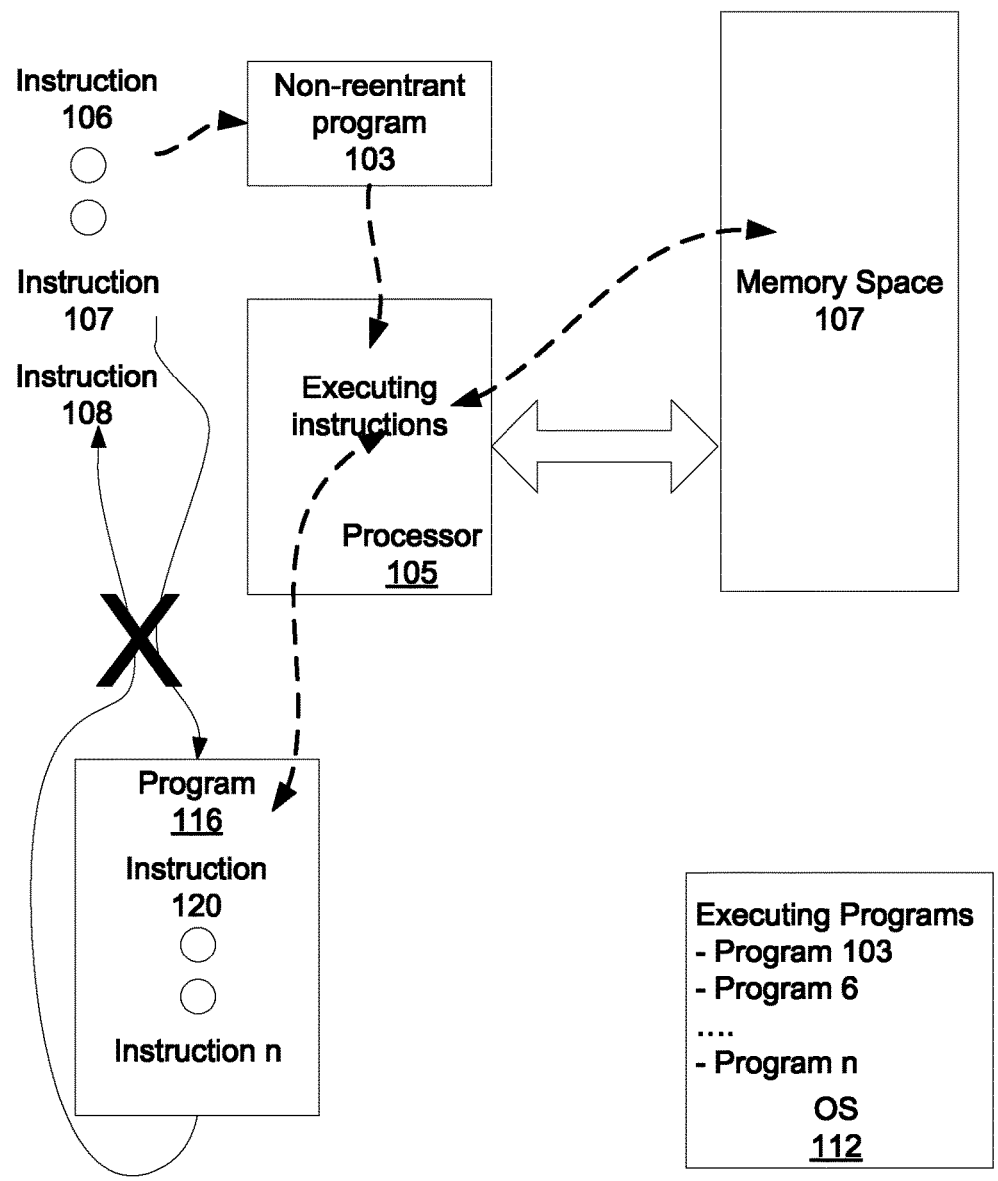
FIG. 1 depicts a situation where reentrancy of a program module is a consideration for correct execution.

FIG. 1 is used to set the context for aspects of the following disclosure. FIG. 1 depicts a processor execution context in which a non-reentrant program 103 has instructions 106-108. Instructions 106-108 can configure a processor 105 to execute operations specified by those instructions. Operations can include operations that require access to a memory space 107. A program 116 also includes instructions, for example instruction 120, that can be used to configure processor 105. In this example an operating system 112 controls scheduling of programs for execution in processor 105. Here program 103 is shown to be executing in processor 105. At instruction 107, non-reentrant program 103 attempts a jump to begin execution of instructions from program 116. A non-reentrant program however cannot allow return to execute instruction 108 after program 116 completes. As such FIG. 1 depicts an example characteristic of a non-reentrant program or section of code, which is that execution correctness cannot be guaranteed for a non-reentrant program if control is transferred to another program, even if control ultimately is returned to the non-reentrant program and all local state is saved. One issue for example is that non-reentrant program 103 may have been operating using a value stored in memory space 107, but program 116 may have modified those values (where memory locks or other memory protection mechanisms are not in use). A non-reentrant program would not be able to detect or correct that circumstance.

In some implementations, a sufficient condition to determine non-reentrancy for an instance is to determine whether that instance would produce conflicting memory accesses during execution. Such conflict can be between or among instances of that code module, or with instances of other code modules. In one example, a code module is analyzed to determine whether instances of that code module will need to be executed serially on a processor under certain conditions. For example, a particular type of code module may have circumstances in which instances will have conflicting memory accesses. Such conflicting memory access may not be ascertainable until particular instances of that code module are under consideration.

In some examples herein, a program module (which can be instantiated) are categorized according to whether a programmer, profiler or compiler considers that program module to require memory conflict checking. Herein, such program module is called non-reentrant, even though, in a particular execution circumstance, it may not pose a conflict with another executing instance.

In an example, a processing architecture provides a serialization mechanism by which execution correctness can be maintained. By providing a serialization mechanism for instances of non-reentrant code segments (modules), a variety of advantages and processing efficiency for heterogeneous multiprocessing can accrue. The following disclosure relates to examples of such architectures and how these architectures may behave.

Figure 2:
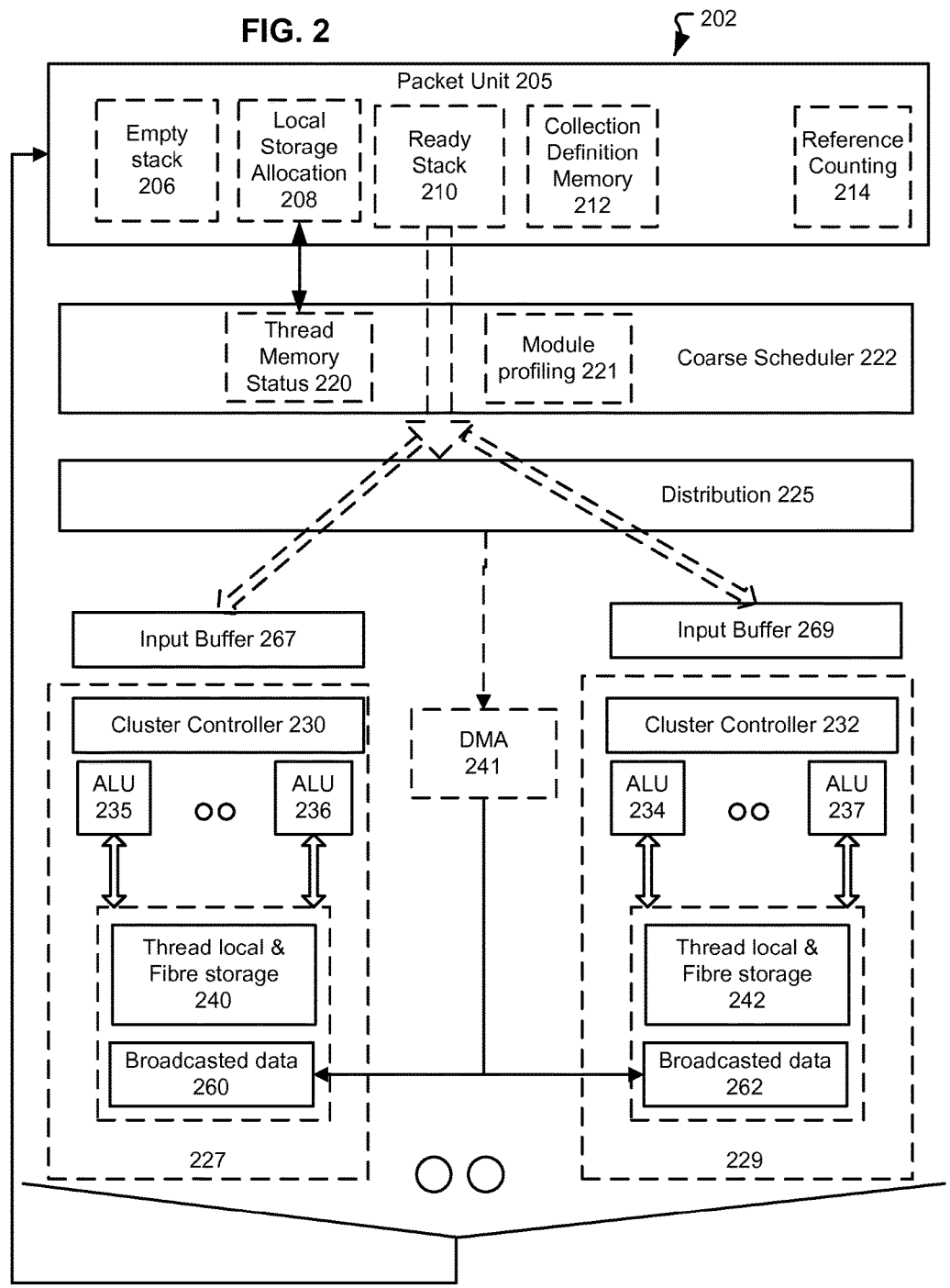
FIG. 2 depicts an example architecture for a heterogeneous computation platform in which reentrant and non-reentrant computation instances can be executed.

FIG. 2 depicts an exemplary system architecture 202 in which disclosed aspects can be practiced. System 202 comprises a packet unit 205, which includes an empty stack 206, a local storage allocator 208, a ready stack 210, a collection definition memory 212, and a packer 214. Packet unit 205 can communicate with coarse scheduler 222, which can include a thread memory status module 220. Coarse scheduler also can contain a program segment profiler 221, which operates to profile program code in order to determine whether it has properties consistent with being non-reentrant. Profiler 221 can flag instances as being reentrant or non-reentrant, in some implementations (e.g, that such instances require memory conflict checks before execution).

Packet unit 205 collects groupings of instances of computation (generally, called instance(s)s for clarity) to be distributed among the plurality of compute clusters, which will perform work specified by the instances, as described below. Coarse scheduler 222 tracks usage of computation resources in the plurality of computation clusters, such as memory allocation and usage. In some implementations, an allocation of a portion of a local memory in a particular computation cluster is static and assigned when setting up the thread on that computation cluster. Coarse scheduler 222 also can allocate instances for execution in the clusters.

In one example, a thread executing on a particular cluster can instantiate a program or indicate a portion of a program to be executed (thereby making an instance). Coarse scheduler 222 can receive the information concerning the instance and allocate a particular cluster to execute the instance. As introduced above, allocation of a instance to execute on a cluster does not indicate that execution would commence immediately, but rather execution of such instance depends on scheduling within the cluster assigned.

An abstraction/distributor layer 225 separates a series of computation clusters (clusters 227 and 229 are depicted) from coarse scheduler 222 and from packet unit 205. Distributor layer 225 accepts groupings of instances from packet unit 205 and causes the instances to be distributed among the computation clusters, according to an exemplary approach described below.

Each cluster comprises a respective controller (controllers 230 and 232 depicted for cluster 227 and 229 respectively). Each cluster controller (e.g., 230 and 232) controls a plurality of arithmetic logic units (ALU) (e.g. cluster controller 230 controls a plurality of ALUs including ALU 235 and ALU 236). Each ALU of a cluster communicates with a local storage memory (e.g. local storage 240). In one implementation, each ALU has a separate and dedicated access path to local storage 240, such that each ALU can read or write concurrently from and to the memory with the other ALUs of that cluster. Memory resources of a given cluster further comprise a broadcasted data memory (e.g. broadcasted data memory 260 of cluster 227). In an example implementation, broadcasted data memory 260 can be implemented in the same physical storage medium as thread local storage 240. In an example, broadcast data memory 260 can be highly interleaved cache that allows a particular location of memory to map to a number of different locations in the broadcast data memory. In some implementations, broadcasted data memory may comprise a ring buffer or FIFO memory implementation. These broadcasted data memories are fed under control of a direct memory access unit (DMA) 241. In one example, implementations of DMA 241 control storage of data in a plurality of broadcasted data memories in a number of clusters. In other examples, such memory 260 can be implemented as a hardware managed cache, such as an LRU cache.

Each cluster comprises an input buffer, e.g. cluster 227 comprises input buffer 267, and cluster 229 has input buffer 269. Each input buffer for each cluster is written by distribution layer 225 and read by the respective controller of that cluster. For example, distribution layer 225 writes to input buffer 267 which is read by cluster controller 230. In view of the above introduction to the components of example system 202, aspects of the operation of this example system 202 are described below.

A collection grouping algorithm is executed by packet unit 205. The collection grouping algorithm operates to collect instances based on matching scheduling keys of respective instances. Additionally each instance can be associated with a respective priority, and in such case a representative priority of a collection of instances can be determined and used in an algorithm to select collections of instances to be executed on the array of clusters. Information identifying instances of selected collections subsequently is dispersed among clusters in the array, as explained below.

Figure 3:
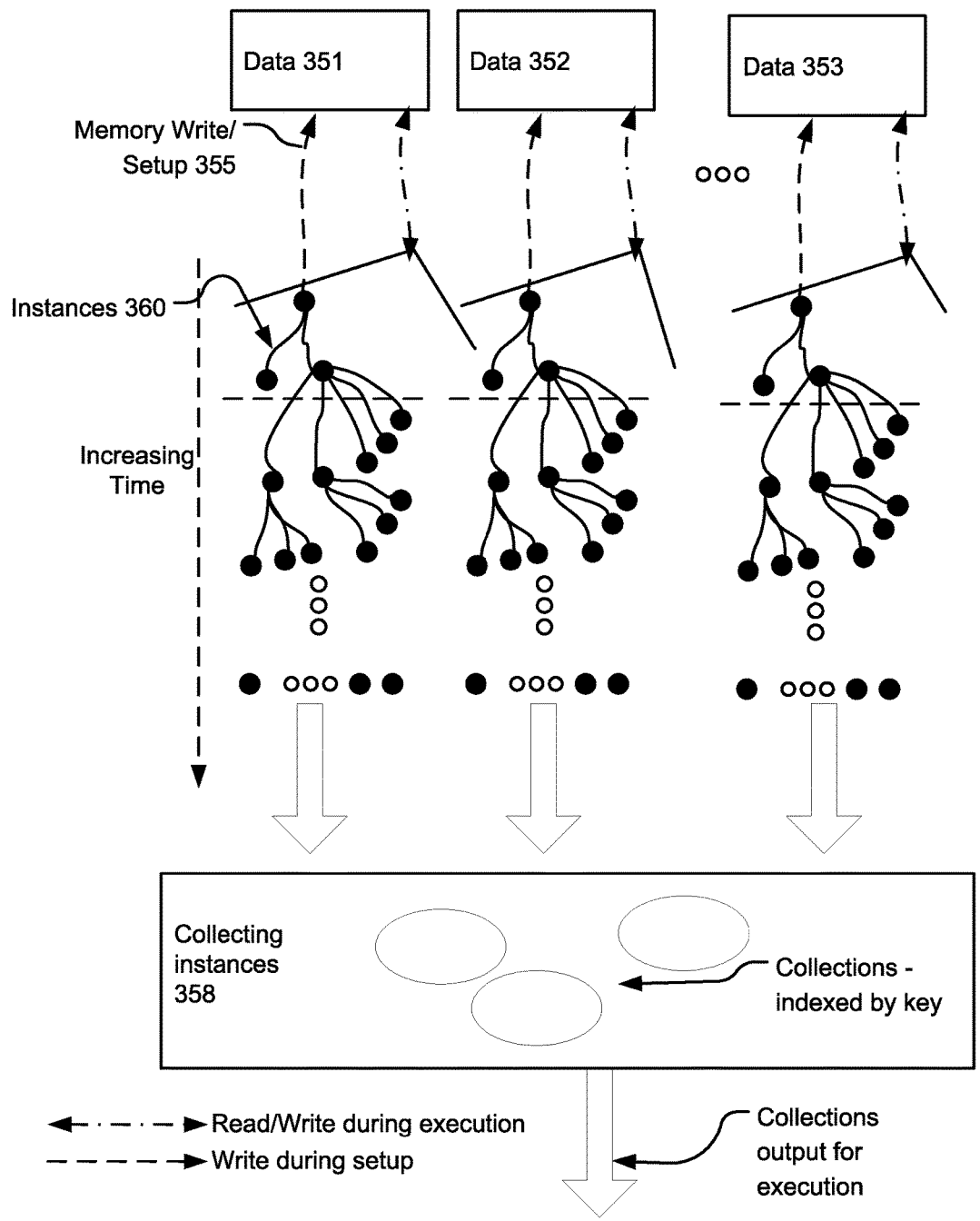
FIG. 3 depicts a flow of dependent non-reentrant instances of computation which can be handled according to the disclosure.

FIG. 3 depicts further aspects of declaration of computation instances, including declaration of storage allocated for instances of computation according to the computation model disclosed herein. FIG. 3 depicts collecting instances according to their scheduling keys. Aspects of FIG. 3 can be implemented within packet unit 205 (FIG. 2), for example.

In the example depicted in FIG. 3, a first instance, such as instance 360, results in allocation of declared storage 351. As computation time progresses, more and more instances may be recursively instantiated, which all reference storage 351. However, each of these instances typically would have a different scheduling key and therefore may be grouped with widely disparate other instances that reference different data elements in storage.

These concepts are depicted in FIG. 3 with declared storage 352 and 353 which each are referenced by a different lineage of instances. FIG. 3 further depicts that all the instances can be managed by collector 358 which forms collections. Collector 358 outputs collections for execution within the computation resources available. During such execution each instance may reference its respective data element, as depicted by the legend which indicates that read/write during execution may be repeated for all instances that descend from an initial instance that created a particular data element.

FIG. 3 thus depicts several examples of computing concepts. One example depicted a computing concept is that many instances depend or are otherwise recursively instantiated from an initial instance, which as shown in FIG. 3 can be created by a thread. By contrast with typical multithreading however each instance is not necessarily scheduled for execution, or even attempted to be scheduled immediately upon its being created. Instead, instances are collected, deferred and scheduled for execution according to a scheduling key. In the example of FIG. 3 scheduling can be accomplished by a centralized scheduling resource which ultimately distributes collections of instances determined to be ready for execution among a plurality of independently operable computation clusters. Regardless of a number of threads that descend from a particular thread each thread ultimately can access the same element of data. In one example, each computation instance that references a particular data element is made to execute serially on a single cluster of the array of clusters, or other available parallel computing resource. Further, because in many such examples each computation cluster can independently operate to switch among executing a plurality of threads or other computation instances, outputting a collection of instances from the collection point does not directly control when such instances are executed. Rather, as explained below, the instances of the collection are stored in an appropriate input buffer for a cluster in which those instances ultimately will be executed.

FIG. 4 continues from the example of FIG. 3; FIG. 4 depicts a stream of incoming groups of instances 432, a scheduling and work distribution abstraction 430 cause the instances of groups to be dispersed among a plurality of clusters. Dispersal, in the example of FIG. 4, comprises storing a reference to the instance and other data that will be described below within a respective local memory for each cluster, which is accessed by a scheduler for that cluster. In particular, an ALU cluster scheduler 420 reads from and maintains local memory 424, while ALU cluster scheduler 422 reads from and maintains local memory 426.

Each ALU cluster scheduler 420 422 controls which stream of instructions is executed on its respective cluster 416 418. Each cluster 416 418 has read and write access to a respective cache 410 412. Additionally, each ALU cluster 416 418 also has read access to a respective simple cache 411 and 413. One operative distinction between caches 410 and 412 with respect to counterpart simple caches 411, 413 is that the simple caches are expected to be overwritten frequently with different data and temporal locality among data accesses expected to be comparatively low. By contrast, caches 410 and 412 are expected to maintain temporal locality to a higher degree.

In the example of FIG. 4, a main memory hierarchy 405 feeds simple caches 411 and 412 responsive to direct memory access setup requests that can be generated by work distribution abstraction 430, for example. However caches 410 and 412 typically would be setup to store data elements that are specifically reserved for collectable computation instances, in addition to local thread storage. Therefore, these caches can be at least partially controlled by pre-allocation, and not based entirely upon instruction-specific memory reads.

Figure 5:
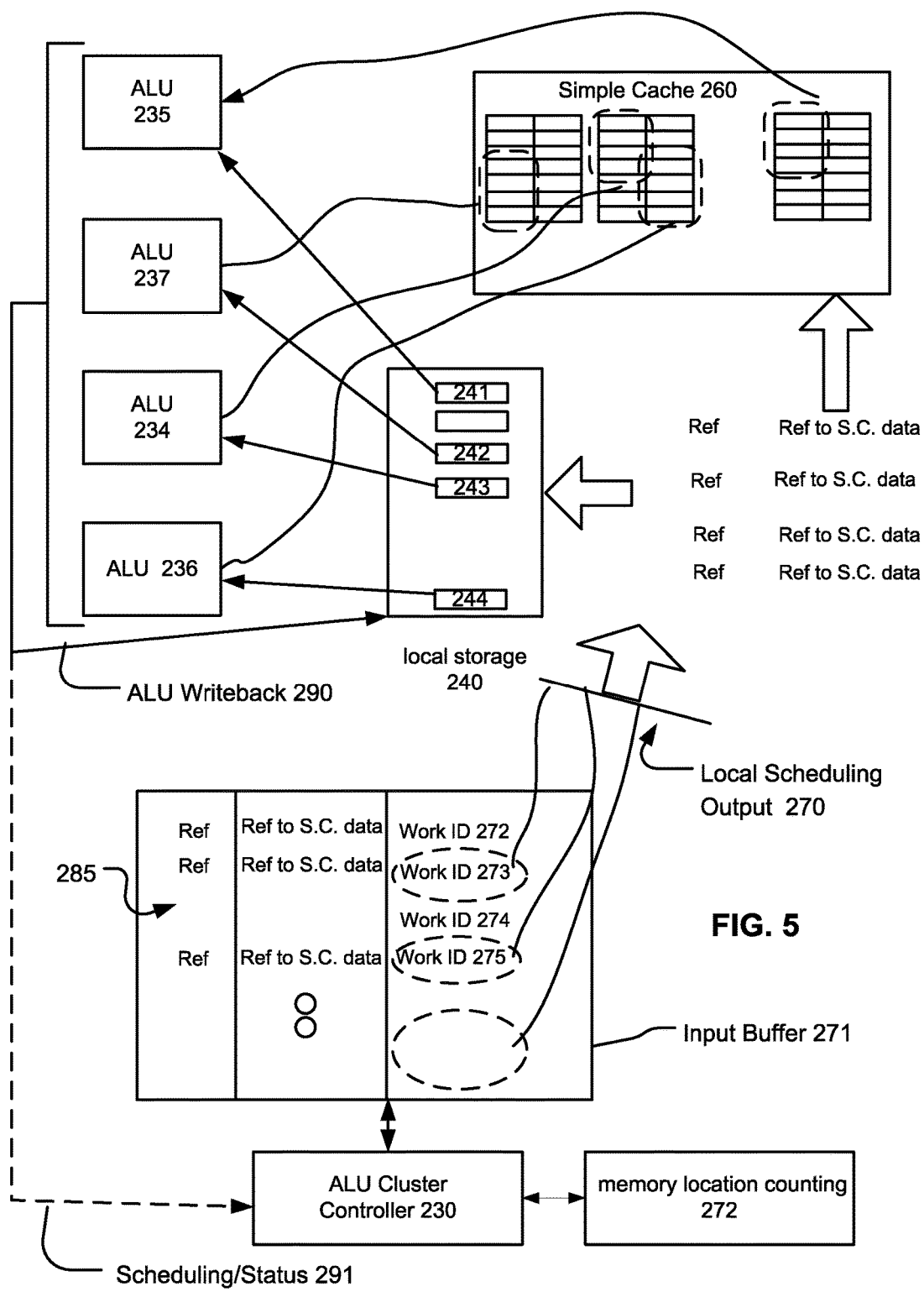
FIG. 5 depicts aspects of an example cluster of arithmetic units.

FIG. 5 depicts an example structure for a cluster that can be used in the array of clusters depicted in FIG. 2, for example. FIG. 5 depicts that cluster controller 230 can maintain a plurality of work identifiers 272-275. Each work identifier can be used to reference a sequence of program instructions available from a memory. In some examples, a memory hierarchy (not separately depicted) can include an instruction cache where recently used instructions may be stored. Such instruction cache can implement a least recently used algorithm for example or a trace cache approach in which a sequence of instructions including branches is maintained within the cache. A trace cache approach may be more appropriate for a cluster in which the ALUs can perform speculative execution, e.g. where cluster controller can include a predictive mechanism for predicting whether branches will be taken or not.

References 285 are used to identify locations 241-244 in local storage 240 that are outputted to ALUs 234-237. Each workload identifier 272-275 also can be associated with a respective reference to simple cache 260. In some examples, this reference can be the same among multiple workload identifiers, but is not necessarily so. To begin execution, local scheduling output 270 can be used to index both local storage 240 and simple cache 260 in order to provide data to be used by ALUs 234-237.

Thus in the implementation depicted in FIG. 5, each ALU executes the same instruction in a given execution cycle. However, data provided for execution of that instruction may vary. Each ALU communicates status 291 to controller 230, such as instance completion information.

For example, such instance information can include information for new instances to be executed within the cluster. Other information that can be maintained between global scheduler and the cluster includes instance reference count information 272. In some examples, such instance reference count information can be maintained within the cluster on which related instances execute. One example implementation causes all related instances to be executed on a single cluster, and in such implementation reference counts can be maintained within that cluster for those related instances.

The example of FIG. 5 also shows that each ALU 234-237 maintains a port to cache 240. Cache 240 stores thread local data. Simple cache 260 can cache global variables. By example, cache 240 also includes a plurality of instance memory locations 241-244, which are operated on by different computation instances that operate from the same thread of control. Writeback 290 returns results or otherwise updates memory locations 241-244 (or potentially other locations in local storage 240).

Figure 6:
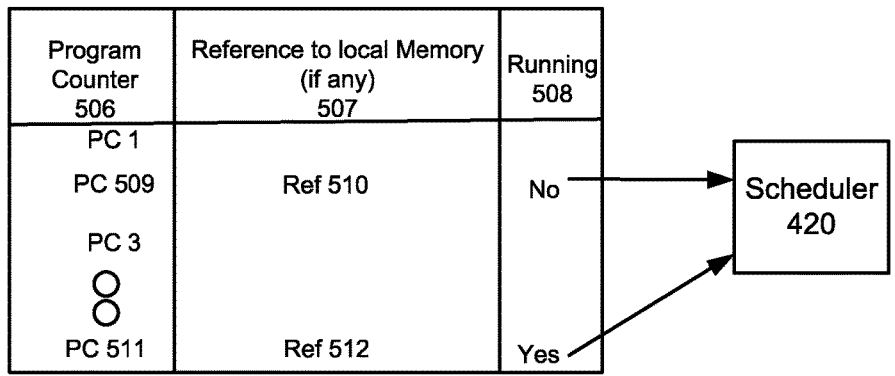
FIG. 6 depicts an example of a scheduler for implementing serialization according to the disclosure.

FIG. 6 depicts a situation in which scheduler 420 is operable to read from a pool of schedulable program instances identified as scheduling pool 505. Scheduling pool 505 can include a list of program counters 506, each program counter can have a corresponding reference to local memory, and a flag 508 indicative of whether that program currently is executing or not. In the example depicted program counter 509 includes a reference to local memory 510. Program counter 511 includes a reference to local memory 512.

Figure 7:
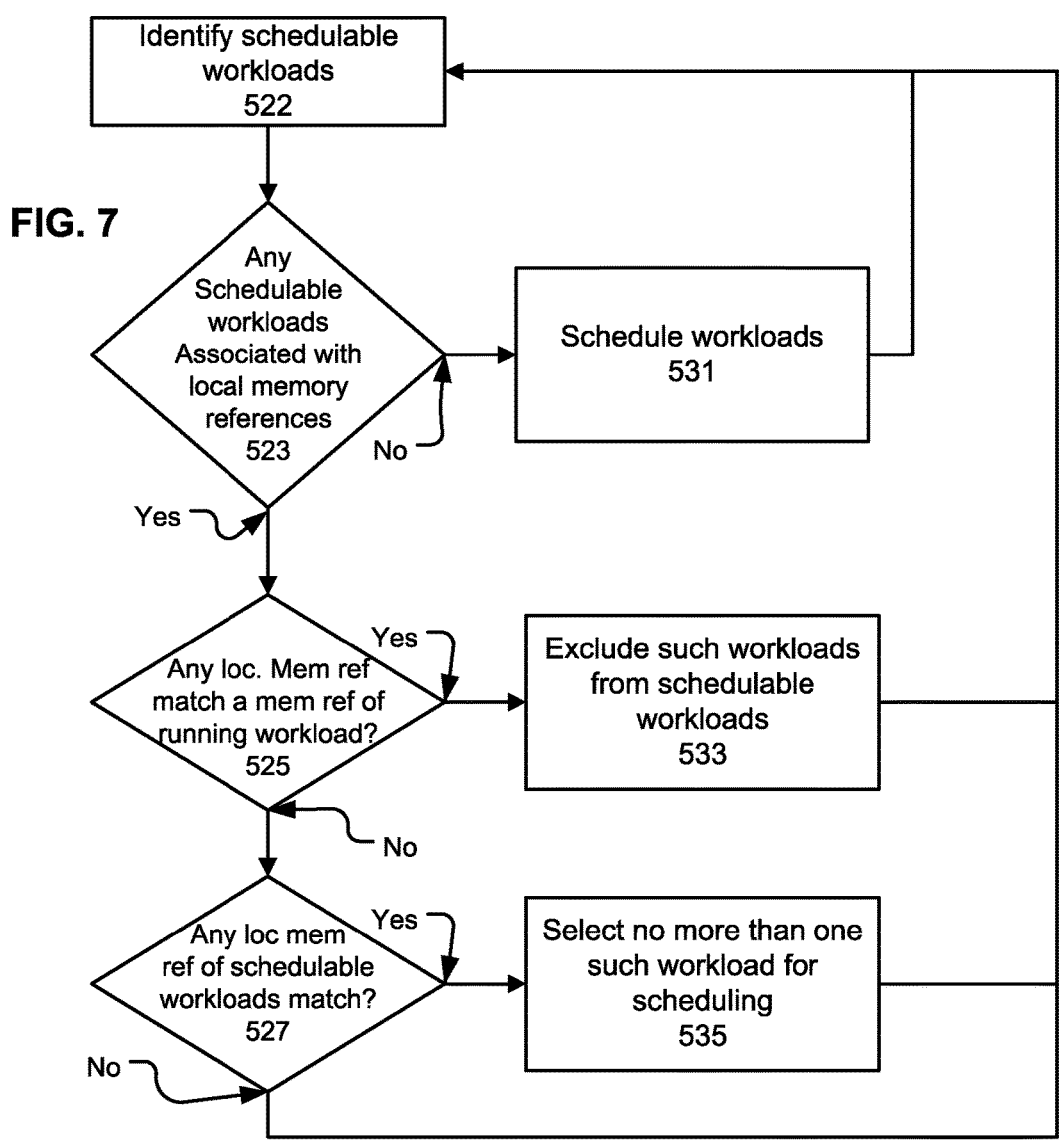
FIG. 7 depicts an example serialization process.

Scheduler 420 uses these inputs in performing a process according to the example scheduling process of FIG. 7. At 522, the process includes identifying schedulable instances. At 523, scheduled instances associated with local memory references are also identified. If there are no schedulable workloads that have a local memory reference, then at 531, workloads can be scheduled according to other criteria, such as a prioritization mechanism, such as a round-robin scheme or so on. At 525, for one or more scheduled workloads that have a local memory reference, it is determined whether any local memory reference from such schedulable workloads matches the memory reference of a running workload.

With respect to the situation depicted in FIG. 6, program counter 509 had memory reference 510. In turn program counter 511 had memory reference 512. Therefore, at 525, scheduler 420 can determine whether memory reference 510 matches memory reference 512. Here matching can include determining whether reference 510 and reference 512 are within a range of memory addresses, or that these references partially overlap. These are examples to show that matching here does not require an exact correspondence but instead identifies whether reference 510 indicates that the program identified beginning at program counter 509 would present a potential memory conflict with respect to the program of program counter 511. Other situations may present or require different matching criteria, so that these examples are not limiting.

At 533, if there was a match between a schedulable instance memory reference and a running instance memory reference, then the schedulable workload is excluded from instances to be scheduled for execution during this scheduling iteration. At 527, a determination is made whether local memory references of schedulable instances match. If there are such schedulable instances, then scheduler 420 selects one of those workloads to be scheduled at 535. As would be understood, the example of selecting one workload of a plurality of such workloads is an example of a process appropriate for a processor architecture where scheduler 420 is scheduling programs that may access a unitary memory space. For architectures that do not have a unitary memory space, e.g. where the architecture has some notion of protected memory spaces, than scheduling for those architectures can be handled by configuring determining steps 523 and 525 to indicate that such memory ranges would not have potential conflicts to begin with.

In one aspect, program counter 509 and program counter 511, can be updated as execution of such programs proceeds. For example, scheduling pool 505 can indicate a current program counter for the running program identified by program counter 511, while program counter 509 would indicate a first instruction of that program to be executed, because that program is not yet running In one implementation, scheduling pool 505 can be updated to remove reference 512 under a circumstance where that local memory access already has occurred. In other words, an architecture can support detection of that one or more memory transactions that could cause a memory consistency problem for other workloads have been completed, such that the tasks awaiting execution can begin execution.

In other implementations such memory references 510, 512 can be static and a characteristic of that instance of code to be executed that remains until such instance of code complete execution.

Figure 8:
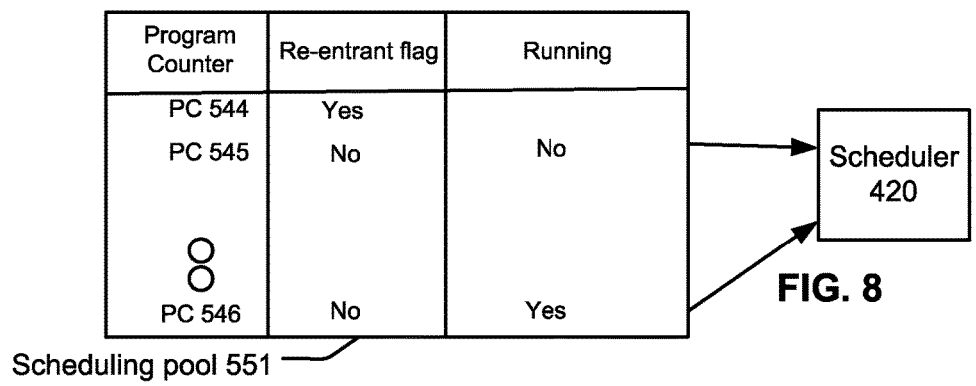
FIG. 8 another example of a scheduling pool and scheduler.
Figure 10:
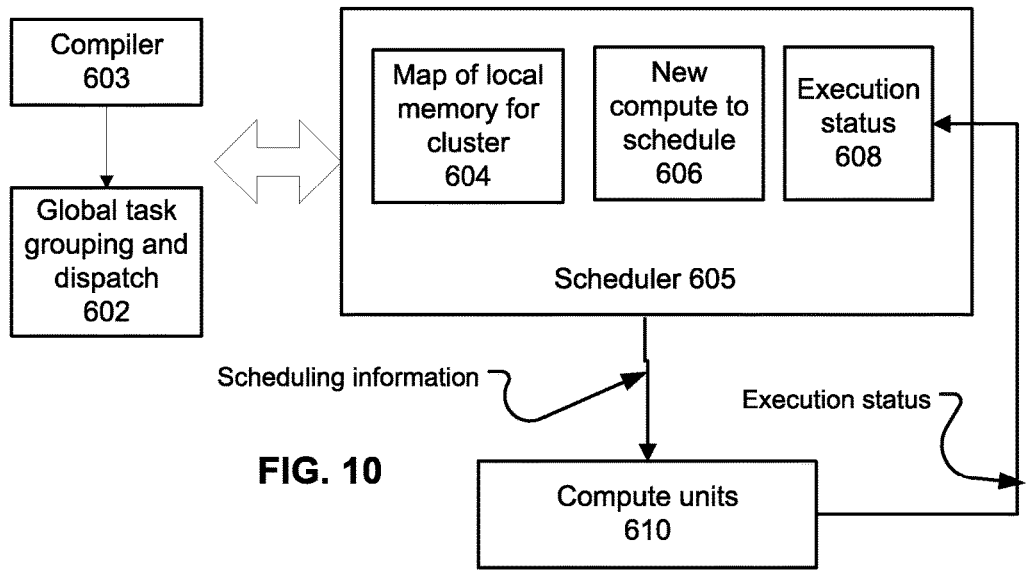
FIG. 10 depicts further example aspects of a scheduler and related functionality for serialization.

FIG. 8 depicts an alternate example of scheduling reentrant and non-reentrant code modules. In particular, FIG. 10 depicts scheduler 420 operable to read from scheduling pool 551 in which is stored information for several programs (instances of portions of code, kernels, or code segments, for example) identified by program counters 544-546. In FIG. 8, each program counter is associated with a reentrant flag. For example, program counter 544 is flagged as being reentrant, by contrast program counter 545 and program counter 546 are flagged as being non-reentrant. Reentrant flag can be implemented as a default such that only programs that deviate from the default are associated with flag. For example, non-reentrant can be a default such that program counter 545 and 546 would not be associated explicitly with a reentrant flag.

Figure 9:
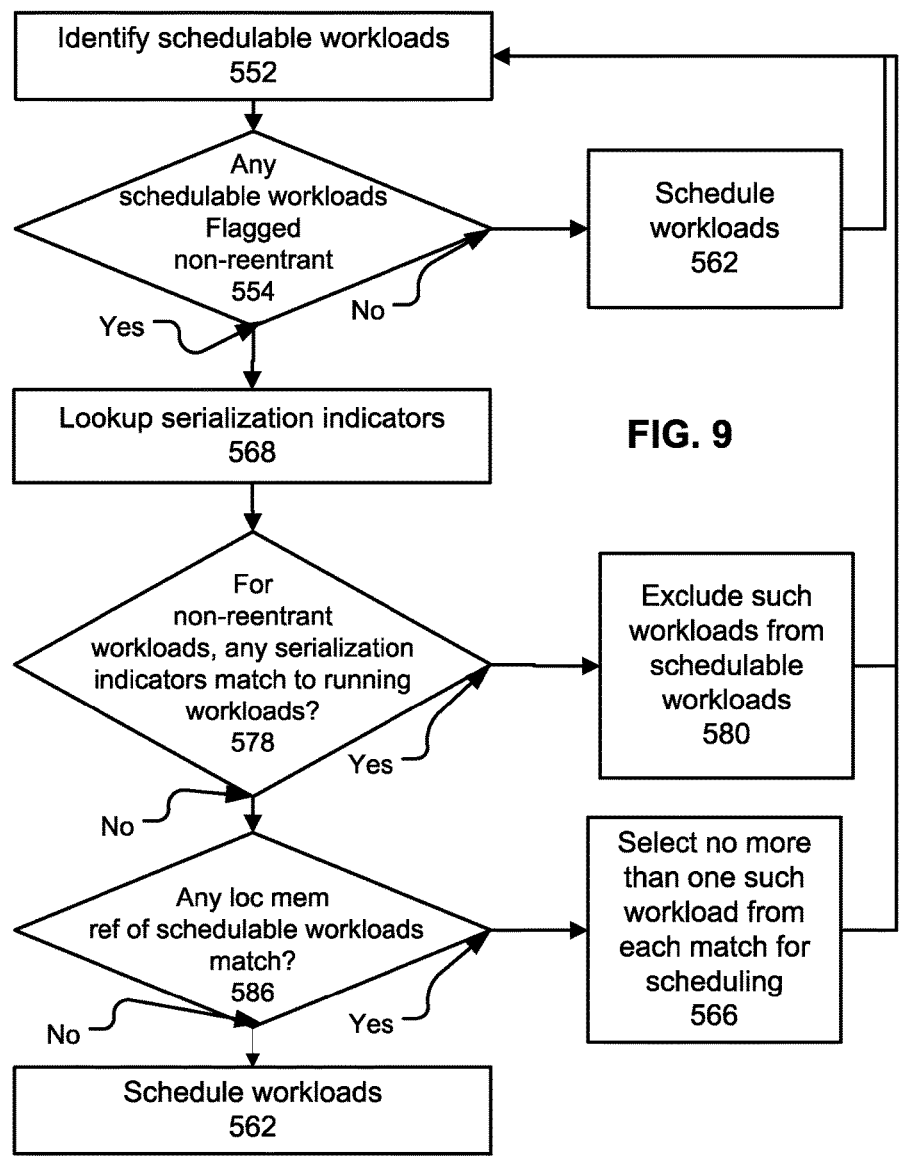
FIG. 9 depicts another example serialization process.

FIG. 9 depicts an exemplary process for scheduling workloads from scheduling pool 551. At 552, schedulable workloads are identified. At 554, a determination is made whether any schedulable workloads are flagged as being non-reentrant. If no schedulable workloads are flagged as being non-reentrant then, at 562, workloads can be scheduled without regard for the remaining aspects of the depicted process. For any schedule workloads that are flagged as non-reentrant, at 568, serialization indicators for those workloads are accessed. These serialization indicators can be generated by a compiler or pre-processor of a program module that will be instantiated during run time. Such serialization indicators can be provided in the program module.

In an example a serialization indicator can be provided as a bitmask in a register or other memory location associated with a workload (or group of workloads, in that workloads can share an indicator, if they have the same serialization criteria). The serialization indicator in order to explicitly serialize execution of instances of particular programs or portions of program code. Serialization indicators can identify a memory address range. At 578, it is determined whether such serialization indicators match to any running (e.g., partially executed) workloads. If so, then at 580 such workloads are excluded from schedulable workloads. At 586, if there are any schedulable workloads that have matching local memory references, then in an example, at 566, one such workload from among a set of workloads that have matching local memory references is selected for scheduling. At 562, other workloads can be scheduled according to a default or typical scheduling process. The example of selecting one workload is for a situation where a particular memory range of interest is not protected by other mechanisms. As such the concept of determining workloads that are to be serialized versus ones that can execute in parallel is handled by an appropriate definition of how local memory references or ranges of memory are compared or matched.

FIG. 10 depicts a scheduler 605 which comprises a map 604 of local memory for a cluster, a repository 606 of instances of computation to be scheduled, and a repository 608 of execution status information. Compute units 610 receive scheduling information from scheduler 605 and output execution status to repository 608. FIG. 10 thus depicts a situation where scheduler 605 operates in a partially decoupled or otherwise asynchronous manner to provide overall scheduling information to compute units and to receive execution status feedback used in scheduling, but is not involved in scheduling of specific functional units within a particular specific processor entity, such as scheduling specific floating-point instructions on a floating point unit. FIG. 10 depicts a compiler 603 that can communicate with a global task group collector. Compiler 603 can input program modules of which instances can be created, and can create serialization information based on profiling the code, or based on other information provided in the program code, and based on characteristics of compute units 610.

Figure 11:
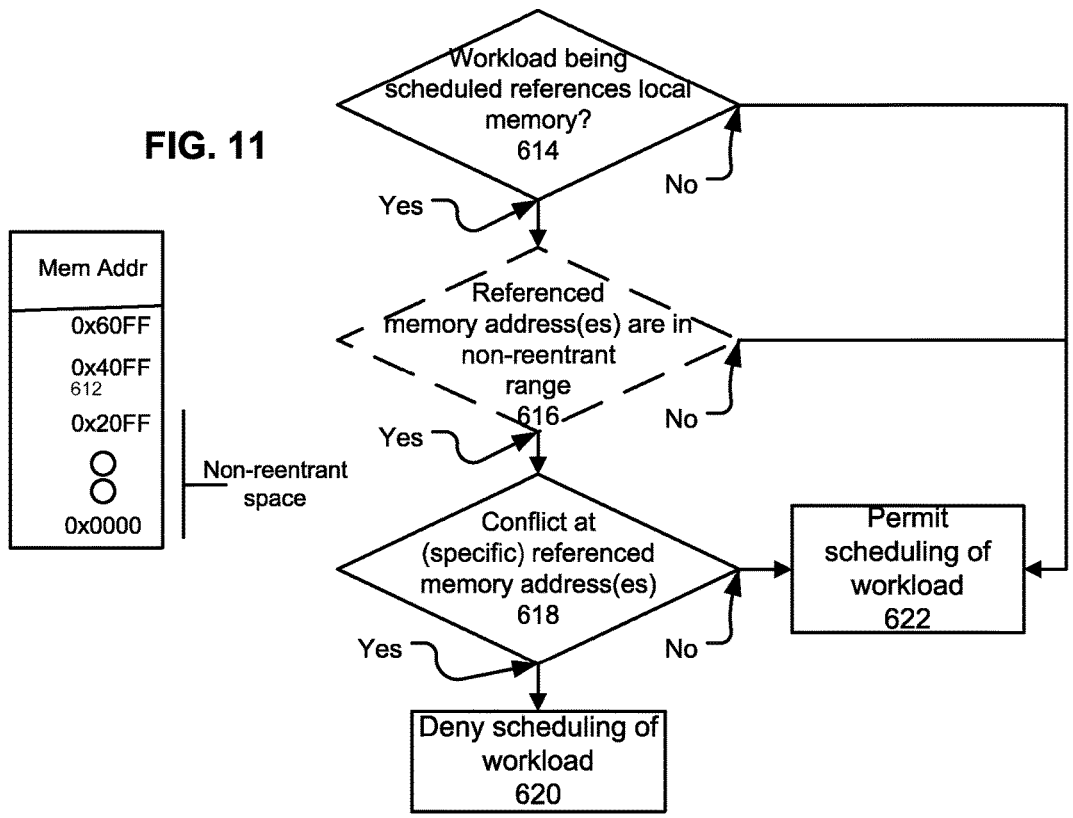
FIG. 11 depicts a further example serialization process.

FIG. 11 depicts an example process of scheduling workloads according to the disclosure. At 614, it is determined whether a workload to be scheduled references a local memory for a compute unit. For example, in some implementations, there may be workloads that do not read from or write to any locally scoped memory location, but instead access only read-only memory. If such workload is being scheduled, then, in the example scheduling process of FIG. 11, such workload can be permitted (622) to be scheduled. With respect to ray tracing, for example, all intersection tests involving a ray against different shapes in a scene (each being an instance of computation or a task herein) can be queued for execution in a computation unit that has local read write access to closest detected intersection information for that ray. During testing, such closest detected intersection information would be updated responsive to detecting a closer intersection than previous detected intersections. To avoid conflicts to this memory location, only one instance that tests this ray is permitted to execute in that computation unit. A remainder of the computation unit can be filled with instances involving testing other rays for intersection.

More typically, workloads would access at least some local memory. Local memory can be divided into space available for use by workloads that are reentrant and space for workloads that are not reentrant. At 616, if a workload is referencing a non-reentrant memory range, a check (618) to identify a potential conflict for that memory range is performed. Without a conflict, at 622, scheduling of such workload can be permitted. At 620, under a circumstance where there is a conflict, scheduling of such workload can be denied or deferred.

These various examples show implementations of a computer architecture that can support a simple fast writable and readable memory, which can be used in some examples to store variables that may be updated a number of times, by a potentially large number of independently scheduled instances of computation. By contrast with memory coherence mechanisms such as locking, memories in the present disclosure can be protected by serializing execution of computation instances that may cause a memory conflict. As such, memory correctness is not handled as a memory coherence question, but rather is addressed as a computation scheduling problem. The disclosures relating to how to parcel a program into separately schedulable computation instances allow a granular scheduling approach to be taken, which in turn provides a pool of schedulable computation instances that can be relatively scheduled to maintain processor utilization even as the serialization activities provide a further scheduling constraint.

Figure 12:
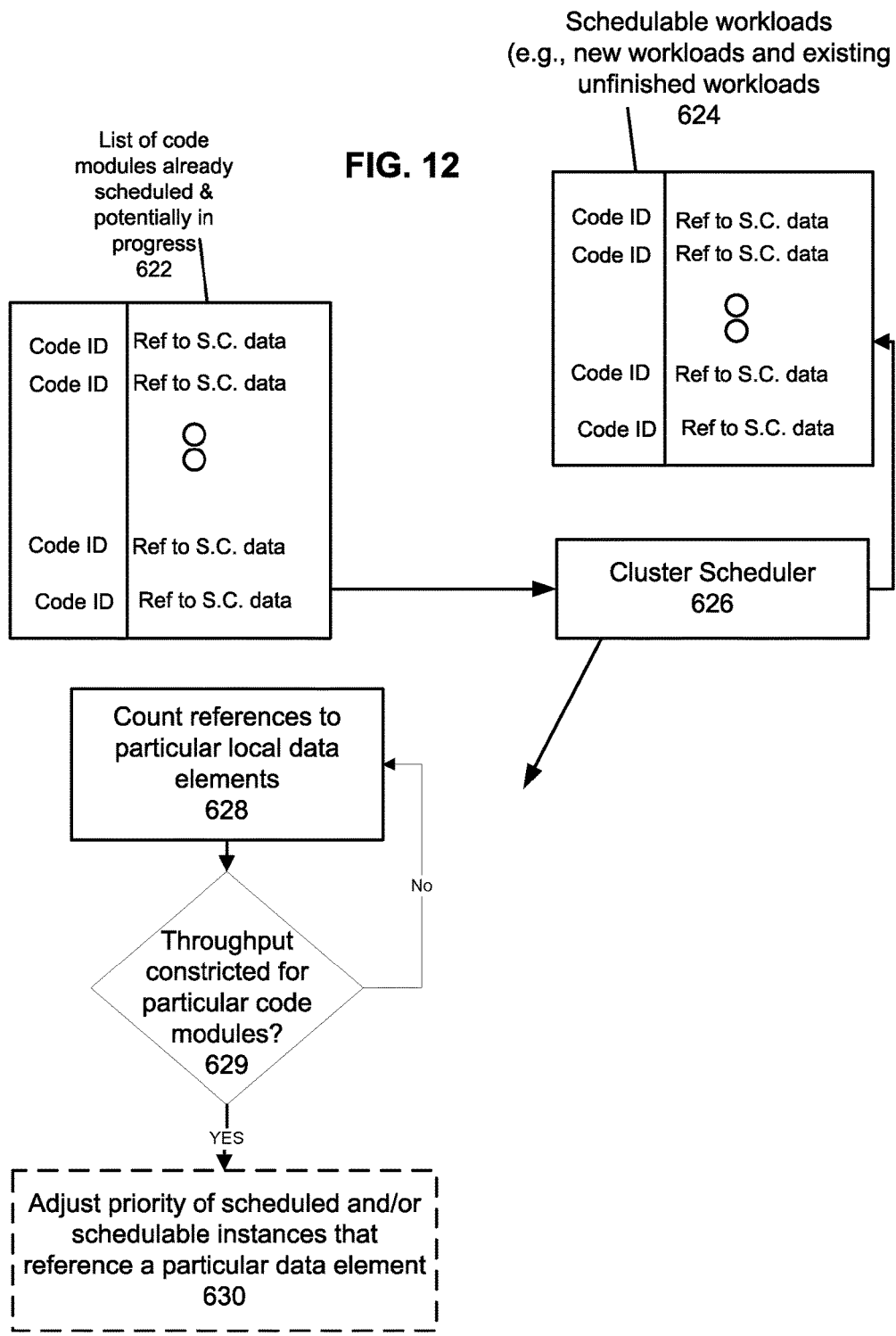
FIG. 12 depicts an approach for prioritizing scheduling of executing instances, responsive to conditions created during serialization.

FIG. 12 depicts an example approach to scheduling computation instances that can be used with the processes and structures described herein. As described above, instances can be serialized as a mechanism to maintain memory correctness. In practice, a given schedulable computation unit may have several different lines of serialized computation instances (i.e., there may be multiple groups of computation instances where group members are to be serially executed with respect to each other. It is conceivable that different kinds of computation instances may have different dynamic behaviors, such that some groups of serialized computation instances may need to be treated differently at different times.

FIG. 12, as an example, depicts a list 622 of code modules that have been scheduled and for which instruction execution may already be in progress, as well as a group of schedulable workloads 624. The list of code modules scheduled and potentially in progress 622 can be a relatively short list of code modules from which an instruction scheduler can select instructions to be scheduled and allocated to specific computation functional units for execution. Scheduled workloads 624 can be a larger list of workloads, such as a list saved on a stack and available for execution at a greater delay by pulling such workload into list 622. Scheduling process can include, at 628, counting a number of references to a particular local data element among schedulable workloads 624. At 629, A decision concerning whether throughput is restricted instances associated with a particular location data element. If not, then the method can return to 628, and if so, then the method can continue to 630. Such decision 629 is an example of a decision whether action should be taken to expedite processing of certain instances.

Based on relative counts of such references, at 630, and execution priority of code modules that reference a particular data element can be adjusted. For example, at 632, if there is in list 622, a computation instance that a particular local data element that is also referenced by a number of computation instances in 624, that computation instance in list 622 may be given a larger allocation of computation resources in order to expedite its completion. For example, instructions for such computation instance may be executed more frequently than a fair allocation for a number of execution cycles. Thus, the existing scheduled instance can be completed more rapidly, so that a new computation instance that references such particular local data element can be scheduled (e.g., by addition to list 622, such that scheduler can begin to schedule instructions in that instance's instruction stream.

Figure 13:
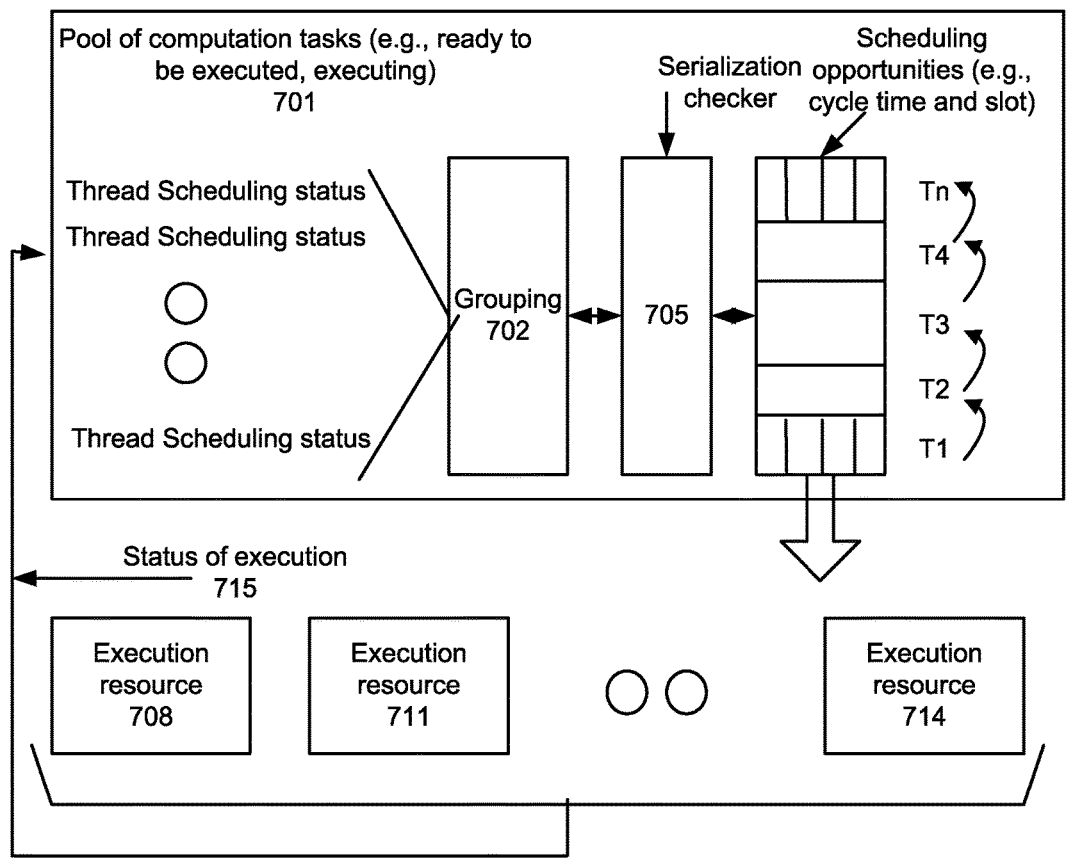
FIG. 13 depicts further aspects of serialization according to the disclosure.

FIG. 13 depicts an example computation architecture in which workloads that are to be serialized according to the disclosure and workloads that do not require such serialization can be heterogeneously processed in execution units 708, 711, 714. FIG. 13 depicts a pool of computation tasks 701 that can include tasks ready to be executed or being executed (instructions for such tasks may have been executed). Scheduling status for such computation tasks are maintained and used as input to a grouping unit 702.

Grouping unit 702 outputs groupings of such computation tasks that are proposed groupings to be scheduled. Grouping unit 702 outputs such proposed groupings to a serialization checker 705. Serialization checker identifies for computation instances that require serialization, whether there are any dependencies that are to be addressed by serialization. As depicted in FIG. 16, these dependencies can be considered for particular instruction execution timeslots T1 through Tn. In some instances, e.g. T2-T4, scheduling opportunities may be entirely consumed by a particular thread, such as a thread that uses a wide SIMD vector, which is reentrant, or both. Thus serialization does not need to be considered. Otherwise serialization checker 705 ensures that each slot in each cycle time is occupied by a computation instance that will not interfere with other computation instances executing in that cycle time.

Figure 14:
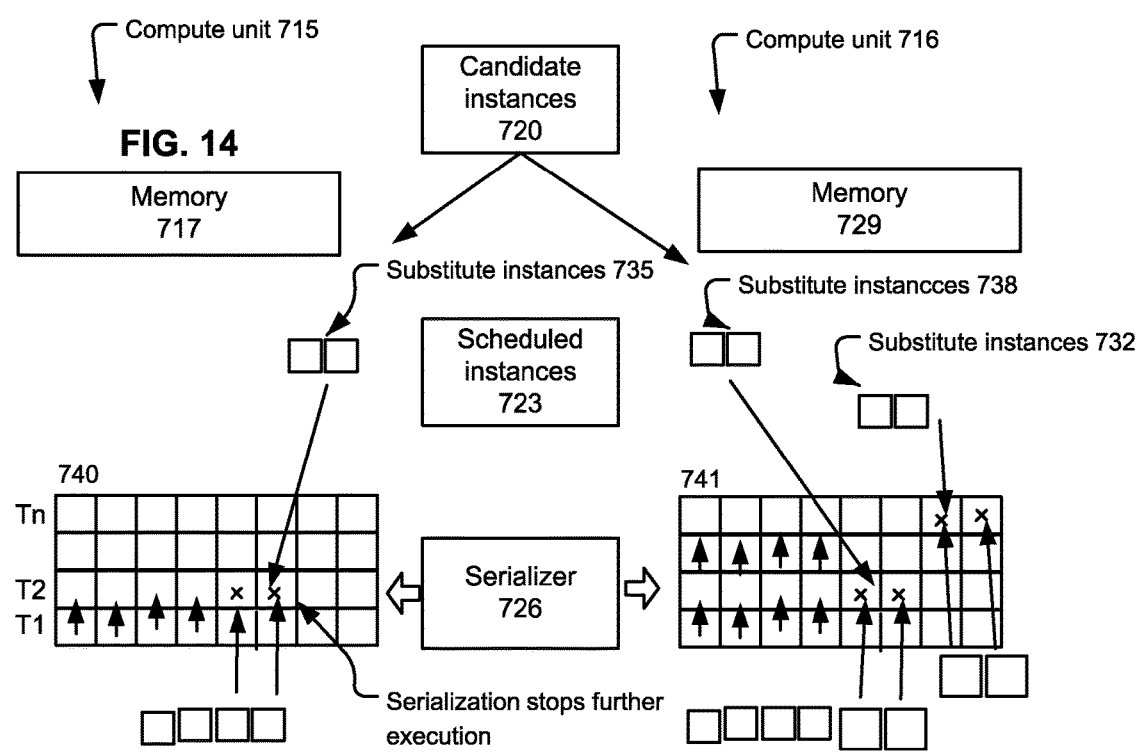
FIG. 14 depicts further aspects of serialization according to the disclosure.

FIG. 14 depicts a further perspective on computer architectures wherein the serializer can co-schedule processing resources that have access to distinct memories. FIG. 14 depicts a source of candidate computation instances 720 to be scheduled for execution, and a list of scheduled computation instances 723. Serializer 726 operates to fill available computation slots for computation units 740 and 741. In an example computation unit 740 and 741 can execute a single thread of control on a vector of data values. FIG. 14 depicts a memory 717 and a memory 729. In an example, memories 717 and 729 have portions that are not to be concurrently accessed by multiple computation instances but such memories do not have memory protection capabilities, such that computation serialization according to the disclosure is implemented. For example, candidate instances provide a source for substitute instances 732, 735 and 738, in response to detecting a conflict during a runtime implementation of serialization. For example, during each execution cycle, serializer 726 can determine whether any of the instances to be executed during that execution cycle make conflicting access to a memory, and if so, serializer 726 can cause substitute instance(s) to be provided to be executed instead of the conflicting instances. Such a runtime example can be used where memory references may be not finally realized until certain dependencies or other calculations are performed. However, it is expected that serialization requirements will usually be clear before beginning to execute a particular instance, especially in situations where all arithmetic units of a cluster will be driven by the same control stream.

As would be apparent from the disclosure, some of the components and functionality disclosed may be implemented in hardware, software, firmware, or any combination thereof. If implemented in firmware and/or software, the functions may be stored as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

Those of skill will also appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

We claim:

1. A system for performing computation, comprising:
a plurality of clusters of computation units, each cluster of computation units comprising a plurality of ALUs and a working memory used by the ALUs during execution of tasks on the ALUs; and
a distributor of computation tasks among the clusters, the distributor coupled to read tasks requiring execution, and operable to assign the tasks for execution on the plurality of clusters, the assigning comprising,
for each of the clusters, determining which locations of each working memory are referenced by non-reentrant tasks currently scheduled for execution in that cluster, and
dispatching non-reentrant tasks for execution by an identified cluster with a working memory that has a location referenced by the respective non-reentrant task, but which was determined as currently not being referenced by any other non-reentrant task scheduled for execution on that cluster,
the identified cluster being configured to execute the dispatched non-reentrant tasks.

2. The system of claim 1, wherein a scheduler assigns reentrant tasks for execution on a cluster based on availability of computation resources required during execution of each task.

3. The system of claim 2, wherein a determination of availability of computation resources comprises determining whether a required portion of memory is available in a particular cluster.

4. The system of claim 1, wherein the distributor comprises a plurality of input buffers for the clusters, the input buffers operable to store descriptions of non-reentrant tasks to be scheduled on a respective cluster awaiting completion of execution of a conflicting non-reentrant task on that cluster.

5. The system of claim 4, wherein the distributor is implemented as logic elements associated with each respective cluster, such that each logic element is independently operable to read tasks from an associated input buffer, and to determine whether tasks read from the associated input buffer can begin execution on the cluster associated with that logic element.

6. The system of claim 1, wherein the distributor is operable to read a task from an input buffer, and to determine whether the task is re-entrant or non-reentrant by comparing a memory location referenced by the task with a set of memory locations identified as containing data associated with non-reentrant tasks.

7. The system of claim 1, wherein the system is operable to categorize a task as non-reentrant by comparing a memory location referenced by the task with a set of memory locations identified as containing data, stored in a shared memory, and which can be written by a set of tasks currently scheduled for execution.

8. The system for performing graphics computation of claim 1, further comprising local schedulers for each cluster of the plurality of clusters of computation units, each local scheduler operable to fill available computation capacity of the ALUs by selecting from a list of tasks, comprising both re-entrant and non-reentrant tasks.

9. The system for performing graphics computation of claim 8, wherein each ALU comprises a Single Instruction Multiple Data (SIMD) execution unit having a vector width, and the local scheduler is operable to switch among different streams of instructions to be scheduled for execution on the cluster, on a cycle by cycle basis.

10. The system for performing graphics computation of claim 8, wherein the system is operable to flag tasks as re-entrant or non-reentrant, and the local scheduler for each cluster is operable to condition the detecting of conflicting tasks on a flag associated with a received task, so that only non-reentrant tasks are checked for conflict by the local scheduler.

11. A machine-implemented method of computation task scheduling, comprising:
   receiving specifications for computation tasks to be executed in a cluster of computation units;
   maintaining a list of tasks that have been scheduled to execute in the cluster, the list comprising information indicating whether any of the tasks on the list are non-reentrant; and
   scheduling tasks to be executed from among the tasks specified by the received specifications, the scheduling comprising deferring scheduling of any task, among the tasks specified by the received specifications, that is non-reentrant and has a capability to write to a memory location shared by any non-reentrant task on the list of tasks; and
   executing the scheduled tasks.

12. The machine-implemented method of claim 11, further comprising determining non-reentrancy of each task by inspecting a flag associated with a definition of the task.

13. The machine-implemented method of claim 11, further comprising determining non-reentrancy of each task by profiling respective program code of which the task is an instance.

14. The machine-implemented method of claim 11, further comprising determining non-reentrancy by detecting an overlap between a memory range indicated as being non-reentrant and a respective memory address accessed by each task.

15. The machine-implemented method of claim 11, further comprising determining non-reentrancy by detecting an overlap between a memory address capable of being written by a task on the list of tasks, and a respective memory address accessed by task to be scheduled for execution.

16. A computation system, comprising:
   a plurality of clusters, each comprising a plurality of ALUs and a memory used by the ALUs as working memory during execution of tasks on the ALUs;
   a global scheduler operable to enqueue packets indicating processing to be conducted on the clusters, each packet identifying a program module and a group of data elements to be distributed among the clusters for use during execution of the program module; and
   respective schedulers for the clusters, each operable to
      receive packets from the global scheduler, to maintain a set of threads for which resources of the cluster have been allocated, and
      determine when a non-reentrant program module from a received packet will be added to the set of threads by determining that one or more of the data elements provided from the global scheduler for that packet are not being accessed by any thread of the set of threads;
   each of the respective schedulers being configured to run the ALUs with instructions from a selected thread, using plural data elements received from one or more packets.

17. The computation system of claim 16, wherein the ALUs of each cluster function as a Single Instruction Multiple Data (SIMD) execution unit comprising an execution vector which can be scheduled on a cycle by cycle basis, and the scheduler for that cluster is operable to fill the execution vector with computation tasks to be executed that collectively do not reference conflicting memory address ranges.

18. An apparatus for computation, comprising:
   a computation unit configured for supporting of interleaved execution of instructions sourced from a plurality of program sources, each with a separate thread of control;
   an input buffer configured for receiving program instances of computation to be executed on the computation unit; and
   a scheduler configured:
      to maintain a list of in-progress program instances for which execution is in progress on the computation unit, and
      in response to completion of execution of an in-progress program instance, to attempt to schedule execution of a replacement program instance on the computation unit selected from among the received program instances, the selecting comprising determining whether any received program instance that is non-reentrant has a conflicting memory access with any remaining in-progress program instances;
   the computation unit being configured to execute scheduled program instances.

19. The computation system of claim 18, wherein a flag associated with the program instance indicates whether the program instance is non-reentrant.

20. The computation system of claim 18, wherein the
   scheduler is operable to treat all received program instances as non-entrant.

21. The computation system of claim 18, wherein the computation unit comprises a Single Instruction Multiple Data (SIMD) execution unit comprising an execution vector which can be scheduled on a cycle by cycle basis, and the scheduler is operable to fill the execution vector with in-progress program instances that reference the same thread of control and which do not collectively reference conflicting memory address ranges.

22. The computation system of claim 18, further comprising a non-transitory machine readable medium, the non-transitory machine readable medium being any tangible medium that is non-transitory and other than transmission media, storing instructions for implementing a compiler that inspects program sources and generates information indicating whether instances of each program source are non-reentrant, for use by the scheduler during runtime scheduling.

* * * * *